Figure 3:
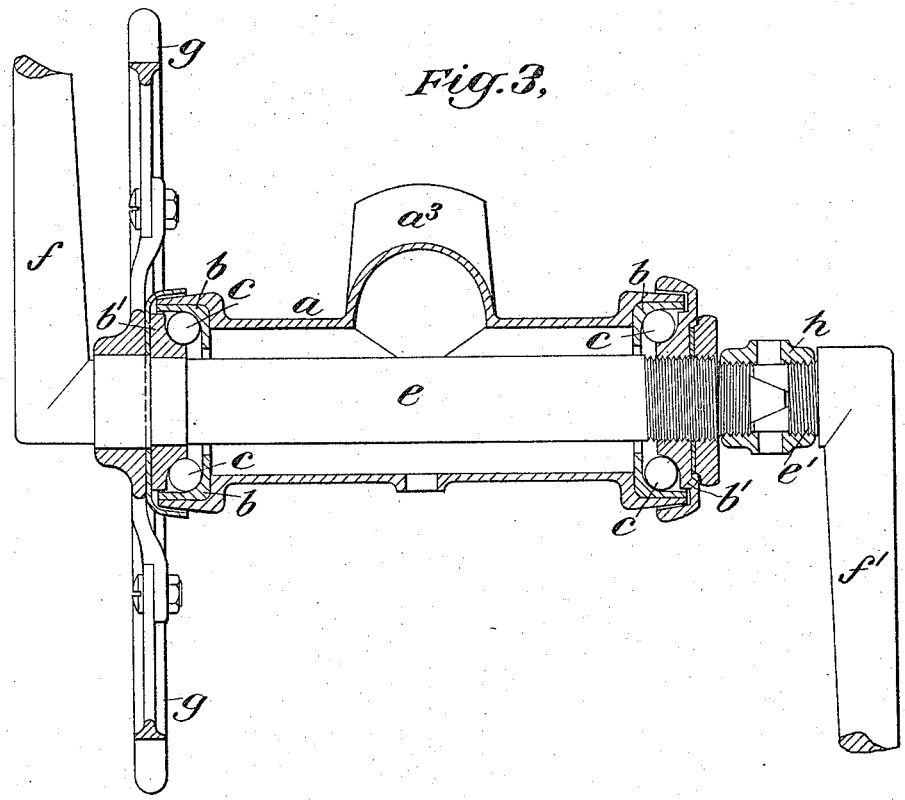

(No Model.) 2 Sheets—Sheet 1.
F. S. LUTHER.
CRANK SHAFT FOR VELOCIPEDES.
No. 535,706. Patented Mar. 12, 1895.
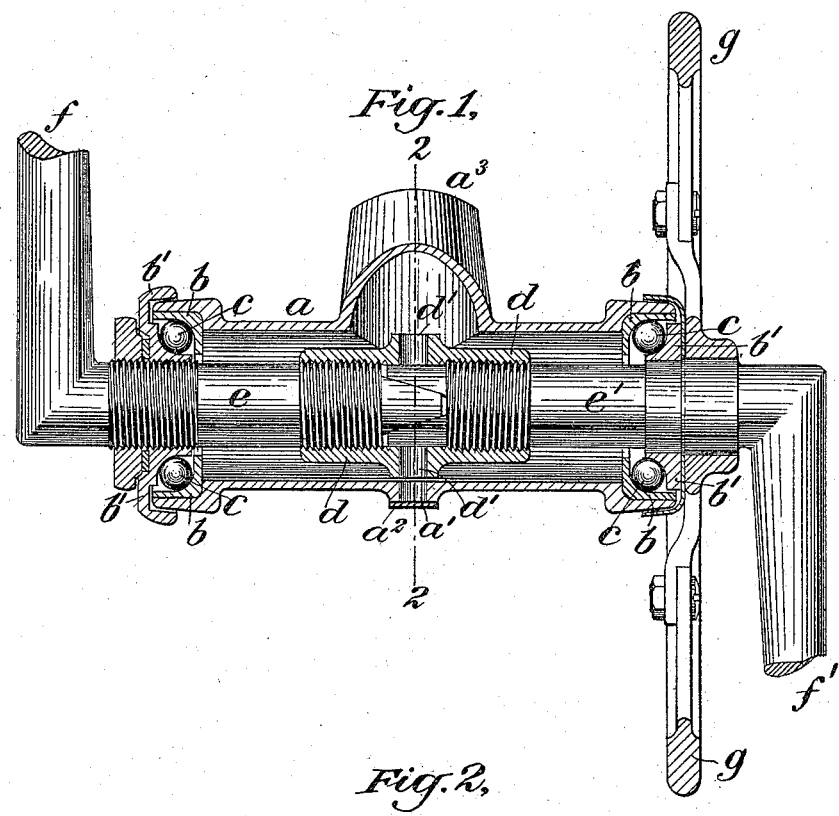
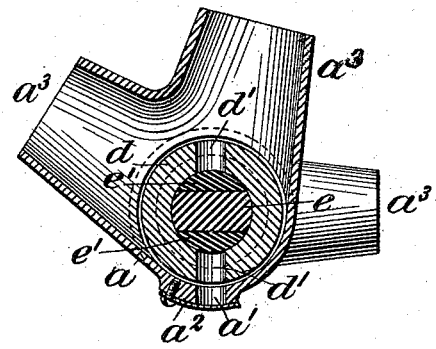
Witnesses:
E. M. Taylor.
F. M. Eggleston.
Inventor:
Flavel S. Luther
By Redding & Kiddle
Attys.

(No Model.) 2 Sheets—Sheet 2.
F. S. LUTHER.
CRANK SHAFT FOR VELOCIPEDES.

No. 535,706. Patented Mar. 12, 1895.

UNITED STATES PATENT OFFICE.

FLAVEL S. LUTHER, OF HARTFORD, CONNECTICUT, ASSIGNOR TO THE POPE MANUFACTURING COMPANY, OF SAME PLACE AND PORTLAND, MAINE.

CRANK-SHAFT FOR VELOCIPEDES.

SPECIFICATION forming part of Letters Patent No. 535,706, dated March 12, 1895.

Application filed July 17, 1894. Serial No. 517,779. (No model.)

*To all whom it may concern:*

Be it known that I, FLAVEL S. LUTHER, a citizen of the United States, residing in the city and county of Hartford, State of Connecticut, have invented certain new and useful Improvements in Crank-Shafts for Velocipedes, of which the following is a specification, reference being had to the accompanying drawings, forming part hereof.

This invention relates to crank shafts such as are usually employed in bicycles and like foot-driven vehicles, and the objects of this invention are lightness, strength, simplicity of construction and ready detachableness of parts, and other features of advantage hereinafter set forth.

In a structure embodying this invention the crank shaft comprises two parts, and each of these two parts has a crank arm formed integrally therewith or permanently secured thereto. The two parts of the crank shaft are locked together so as to be held together rotatively, and a holding device is provided for the parts of the crank shaft which permits the parts of the crank shaft to be brought together or separated by rotation relatively to said holding device, and a power transmitting device is operated by said shaft independently of the holding device. As a consequence of the separate connection of the power transmitting device to the crank shaft, and of the interlocking of the two parts of the crank shaft so that they are compelled to rotate together, power applied to either or both crank arms in either direction is transmitted without causing rotative stress between the holding device and either part of the crank shaft and without tending to separate the parts of the crank shaft, and the parts are firmly held together in the operation of the machine and cannot be separated except by the intentional act of the operator, and in order thus to separate the parts, the operator applies power to the holding device, either to hold it while the two parts of the crank shaft are rotated, or to rotate the holding device itself or otherwise to rotate the holding device and crank shaft relatively to each other; and by this relative rotation the parts of the crank shaft may be readily separated and removed, or starting with the parts separated they may be readily secured together in condition for use.

According to my complete invention as it has been embodied in the crank shafts of bicycles, screw threaded portions are formed upon each part of the crank shaft, a right hand thread on one part of the shaft, and a left hand thread on the other part of the shaft, and the holding device comprises a sleeve having counterpart threads engaging with the threaded portions of both parts of the crank shaft, and the abutting ends of the crank shaft are shaped so that they will interlock when brought together so as to be held together rotatively. The power transmitting device comprises a wheel, usually a sprocket wheel, secured upon the crank shaft independently of the reversely threaded holding sleeve, and said sleeve is located within the bracket supporting the bearings of the crank shaft, and means are provided whereby it may be grasped by a tool inserted through an opening in said bracket when it is desired to screw together or unscrew the parts of the crank shaft.

One of the important advantages attained in bicycles in a construction embodying my entire invention is the narrowing of the tread. The heavy bosses usually employed upon the cranks at the connection of the crank arms with the crank shaft are not required in this improved construction, as the crank arms may be formed integrally with the crank shaft, and may be forged so as to extend radially therefrom with a sharp bend at the outer ends of the parts of the crank shaft, and the only other part upon the crank shaft outside of the crank shaft bracket is the hub of the sprocket wheel which hub may be made quite narrow. Therefore the crank arms can be brought more closely together and thus the tread narrowed. This has proven to be an important advantage as it brings the feet of the rider more closely together, thus approximating more nearly the natural positions of the feet in walking and permitting the muscular power of the limbs of the rider to be exerted more directly upon the pedals. Other advantages are a material reduction in weight and a neater and more ornamental appearance by reason of the omission of the usual large and heavy hubs of the crank arms, and the ready detachableness of parts.

The accompanying drawings illustrate embodiments of my invention.

Figure 1 is a vertical sectional view on a plane extending transversely of a bicycle, and longitudinally of the crank shaft, showing a crank shaft, crank shaft bracket and bearings, a sprocket wheel and portions of the crank arms and frame of a bicycle. Fig. 2 is a section of the same taken on a plane indicated by the line 2—2 of Fig. 1. Fig. 3 is a vertical sectional view similar to Fig. 1, but showing a modified construction.

The crank shaft bracket $a$ may be of any ordinary construction and is shown as of tubular form and in one piece with or brazed to arms $a^3$ of a bicycle frame, short sections only of which are shown. The crank shaft bracket has enlarged ends within which are held ball tracks or races $b$, against which bear the balls $c$ of ball-bearings for the crank shaft. Cones $b'$ are formed upon or secured to the crank shaft and bear against these balls. One of these cones is shown as adjustable, and the other is permanently secured upon the crank shaft.

The crank shaft is formed in two parts, each part having a crank arm integral therewith or permanently secured thereto, and these two parts have threaded portions, one part a right threaded portion and the other a left threaded portion, whereby they are held within a sleeve which has threaded portions corresponding to those of the parts of the crank shaft. In the construction shown in Figs. 1 and 2 this reversely threaded sleeve $d$ is arranged within the crank shaft bracket and at about the middle of the crank shaft and between the ball-bearings thereof, thus occupying a space necessarily provided between the bearings and not usually utilized. The two parts $e$ and $e'$ of the crank shaft are provided at their abutting ends with interlocking faces shown as formed by a wedge-shaped projection or tooth on the part $e$ entering a counterpart socket or opening of the part $e'$, and these interlocking portions act to hold together rotatively the two parts $e$ and $e'$ of the crank shaft, so that they are compelled to rotate together. The crank arms, portions of which only are shown, and which may be of any desired construction, are lettered $f$ and $f'$, respectively.

The sleeve $d$ is so shaped that it may be grasped and held from rotation or rotated, when it is desired to attach or remove the parts of the crank shaft. To this end I provide one or more sockets $d'$ in the sleeve $d$, as shown, and provide a corresponding opening $a'$ in the wall of the crank shaft bracket, so that a pin may be inserted through said opening $a'$ and into one of the sockets $d'$ and thereby the sleeve $d$ may be held from rotation while the operator, taking hold of the crank arms or pedals, rotates the parts of the crank shaft and thus unscrews them out of the sleeve or screws them into the sleeve. The sleeve may in some constructions have flat portions or be otherwise shaped so as to be gripped by a wrench inserted into the bracket through a suitable opening. The opening $a'$ in the bracket may be covered by a hinged or removable cap, as $a^2$, to exclude dust.

The operations of attachment or removal of the parts of the crank shaft may be readily and rapidly performed, the crank arms affording the desired leverage for manipulating the screw threads. When the two parts of the crank shaft are to be inserted, these two parts are started from opposite ends of the sleeve, and the sleeve held by a pin or otherwise, as above described. The two parts of the crank shaft are rotated together and as they enter the sleeve and approach each other, their ends will interlock, and the screwing up may be continued until they are very tightly clamped together. Then the pin holding the sleeve is removed and the parts will be firmly and tightly held together and cannot be separated or loosened except by again inserting the pin and holding the sleeve and reversing the above described operation.

The power transmitting wheel, shown as a sprocket wheel $g$, is shown as provided with a detachable rim as well understood in bicycle construction, and its hub is brazed or otherwize permanently secured upon one of the parts, as the part $e'$ of the crank shaft, and is secured thereto entirely independently of the reversely threaded sleeve $d$, so that rotative strains applied to this power transmitting wheel do not tend to cause rotation of the sleeve $d$ relatively to the crank shaft. This is an important feature of my invention, and enables the crank shaft to be rotated in either direction and the power transmitting wheel to receive from or impart to the crank shaft rotative movements or strains in either direction, without affecting the sleeve $d$ in relation to the crank shaft, and without causing unscrewing thereof. Under the varied conditions of use of a bicycle or other foot-driven vehicle, these rotative strains are exerted in reverse directions between the crank shaft and the power transmitting wheel, as in back pedaling, when the rider is exerting his strength in opposition to the forward movement of the vehicle, and the connection between the power transmitting wheel and the crank shaft is frequently subjected to heavy backward stress.

It is of course evident that the advantages of my invention may to some extent be attained in a structure in which the pedal arms are not integral with the crank shaft, and in such a construction the pedal arms may be shrunk or otherwise permanently secured upon the crank shaft as well understood by those skilled in the construction of crank shafts and arms; also that the arrangement of the holding device or sleeve within the crank shaft bracket may in some cases be departed from, as for instance in the modified construction shown in Fig. 3, in which a short reversely threaded sleeve $h$, is arranged upon the crank shaft outside of the crank shaft bracket, and the crank shaft is divided near one end and the ends are reversely threaded and provided with an interlocking joint in the same manner as shown in Figs. 1 and 2. It is of course to be noted that in this modified construction the location of the sleeve $h$ outside of the crank shaft bracket results in a wider tread than in the construction shown in Figs. 1 and 2 embodying my entire invention. It is also evident that other holding means adapted to be interlocked by rotating or screwing one part within the other, may be employed in place of the screw threads shown, and that various modifications may be made in the construction and arrangement of the parts without departing from my invention. I do not therefore limit my invention to the particular construction herein shown or specifically described, but

What I claim, and desire to secure by Letters Patent, is—

1. The combination of a crank shaft comprising two interlocking parts so shaped at their interlocking joint that the parts when interlocked are compelled to rotate together, each of said parts containing a screw threaded portion, the screw thread of one part being in the reverse direction to that of the other part, and suitable bearings for said crank shaft and a holding sleeve provided with reverse threads engaging with the threads of both parts of said shaft, and a power transmitting device operated by said crank shaft independently of said reversely threaded holding sleeve, substantially as set forth.

2. The combination of a crank shaft comprising two interlocking parts so shaped at their interlocking joint that the two parts when interlocked are compelled to rotate together, each of said parts of the crank shaft having a crank arm, integral therewith, and each of said parts containing a screw threaded portion, the screw thread of one part being in the reverse direction to that of the other part, and suitable bearings for said crank shaft and a bracket supporting the same, and a holding sleeve provided with reverse threads engaging with the threads of both of said parts of the crank shaft, said sleeve being located within said bracket and provided with means whereby it may be grasped by a tool inserted through an opening in said bracket, and a power transmitting device operated by said crank shaft independently of said reversely threaded holding sleeve, substantially as set forth.

3. The combination of a crank shaft comprising two parts adapted to be locked so as to be held together rotatively, each of said parts containing a screw threaded portion, the screw thread of one part being in the reverse direction to that of the other part, and suitable bearings for said crank shaft and a bracket supporting the same and a holding sleeve provided with reverse threads engaging with the threads of both of said parts of the crank shaft, said sleeve being located within said crank shaft bracket and provided with one or more sockets whereby it may be held from rotation by a pin inserted through an opening in said bracket and bearing against the sides of said opening in the bracket, substantially as set forth.

4. A crank shaft for velocipedes having two sections, and means for preventing one from rotating independently of the other and a sleeve for detachably connecting the same, whereby they may be brought together or separated by rotation both in the same direction relative to the said sleeve, and a power transmitting device attached to one section and independent of the said sleeve, substantially as described.

This specification signed and witnessed this 14th day of July, A. D. 1894.

FLAVEL S. LUTHER.

In presence of—
FELTON PARKER,
ALVIN W. COMSTOCK.